(12) United States Patent
Hartmann et al.

(10) Patent No.: US 7,900,596 B2
(45) Date of Patent: Mar. 8, 2011

(54) METHOD AND DEVICE FOR OPERATING AN INTERNAL COMBUSTION ENGINE

(75) Inventors: Dirk Hartmann, Stuttgart (DE); Georg Mallebrein, Korntal-Muenchingen (DE); Werner Mezger, Eberstadt (DE); Andreas Roth, Muehlacker-Lomersheim (DE); Henri Barbier, Schwieberdingen (DE); Nikolas Poertner, Stuttgart (DE); Juergen Rappold, Ilsfeld-Auenstein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 11/988,845

(22) PCT Filed: Jul. 20, 2006

(86) PCT No.: PCT/EP2006/064437
§ 371 (c)(1),
(2), (4) Date: Apr. 2, 2009

(87) PCT Pub. No.: WO2007/014861
PCT Pub. Date: Feb. 8, 2007

(65) Prior Publication Data
US 2009/0205609 A1    Aug. 20, 2009

(30) Foreign Application Priority Data
Aug. 3, 2005 (DE) .................. 10 2005 036 441

(51) Int. Cl.
*F01L 13/06* (2006.01)

(52) U.S. Cl. .............. 123/320; 123/198 F; 123/481; 701/110

(58) Field of Classification Search ............... 123/481, 123/198 F, 320, 325, 333; 701/110
See application file for complete search history.

(56) References Cited

U.S. PATENT DOCUMENTS

| 4,977,876 | A | 12/1990 | Nanyoshi et al. |
| 6,692,404 | B2 * | 2/2004 | Matsubara et al. ............ 477/4 |
| 7,089,103 | B2 * | 8/2006 | Katakura et al. ............ 701/54 |
| 7,308,962 | B2 * | 12/2007 | Sen et al. .................. 180/179 |
| 7,433,774 | B2 * | 10/2008 | Sen et al. .................. 701/102 |
| 2004/0163866 | A1 | 8/2004 | Sen et al. |
| 2004/0237935 | A1 | 12/2004 | Fukusako et al. |

FOREIGN PATENT DOCUMENTS

| JP | 2004-278520 | * 10/2004 |
| JP | 2004 332618 | 11/2004 |

* cited by examiner

*Primary Examiner* — Hai H Huynh
(74) *Attorney, Agent, or Firm* — Kenyon & Kenyon LLP

(57) ABSTRACT

A method and a device for operating an internal combustion engine are provided which make it possible to implement different deceleration requests to the internal combustion engine by switching over between half engine operation and full engine operation. A deceleration request is received particularly in a nonoperating state. A switchover is made between a first operating state and a second operating state of the internal combustion engine as a function of the magnitude of the deceleration request. The first operating state and the second operating state differ, in this instance, in the number of cylinders whose charge changing process is interrupted.

19 Claims, 2 Drawing Sheets

METHOD AND DEVICE FOR OPERATING AN INTERNAL COMBUSTION ENGINE

FIELD OF THE INVENTION

The present invention relates to a method and a device for operating an internal combustion engine, particularly in a nonoperating (non-fired) state.

BACKGROUND INFORMATION

It is known, in this context, that, during the operation of the internal combustion engine, an engine control unit of the internal combustion engine receives a deceleration request, for instance, based on the operation of a brake pedal by the driver, or based on a driving-dynamics control, that is to be realized by the engine, or rather the internal combustion engine.

SUMMARY OF THE INVENTION

The method according to the present invention and the device according to the present invention for operating an internal combustion engine in a nonoperating state have the advantage, on the other hand, that the internal combustion engine is switched over between a first operating state and a second operating state of the internal combustion engine, as a function of the magnitude of the deceleration request, the first operating state and the second operating state differing in the number of cylinders whose charge changing process is interrupted. In this way, the realization of different deceleration requests may be supported by a different number of the internal combustion engine's cylinders whose charge changing process has been interrupted. Different deceleration requests may be realized better and faster, in this manner, so that the safety of a vehicle driven by the internal combustion engine is increased.

It is particularly advantageous if the number of cylinders whose charge changing is interrupted is selected to be greater in the first operating state than in the second operating state. In this way, the second operating state is able to be used for realizing a greater deceleration request than the first operating state.

Conversely, the second operating state may be used to realize a smaller deceleration request than the first operating state if the number of cylinders, whose charge changing process has been interrupted, is selected to be smaller in the first operating state than in the second operating state.

It may be advantageously provided, in this context, that in the first operating state the charge changing process of half the cylinders is interrupted. In the case of an internal combustion engine having an even number of cylinder banks, this makes it possible to interrupt completely the charge changing process in one-half of the cylinder banks, which is particularly simple to implement.

An additional advantage comes about if, in the first operating state, the charge changing process of every other cylinder in the firing order is interrupted. This ensures quiet engine operation even in the first operating state.

It is also of advantage if the charge changing process is activated for all cylinders in the second operating state. In this way, the second operating state is also particularly simple to implement, and also enables quiet engine operation.

As the criterion for switching over from the first operating state to the second operating state, the use of a first specified threshold value is suitable in a particularly simple manner, which has to be exceeded for the switchover named by the deceleration request.

As the criterion for switching over from the second operating state to the first operating state, the use of a second specified threshold value is suitable in a particularly simple manner, which has to be undershot by the deceleration request.

In the simplest way, the first specified threshold value and the second threshold value may be selected to be the same, in this instance.

In order to prevent too frequent a switchover between the first operating state and the second operating state, a hysteresis may be set by selecting the first operating state and the second operating state to be of different magnitudes, where the first specified threshold value should be selected to be larger than the second specified threshold value.

DETAILED DESCRIPTION

Figure 1:
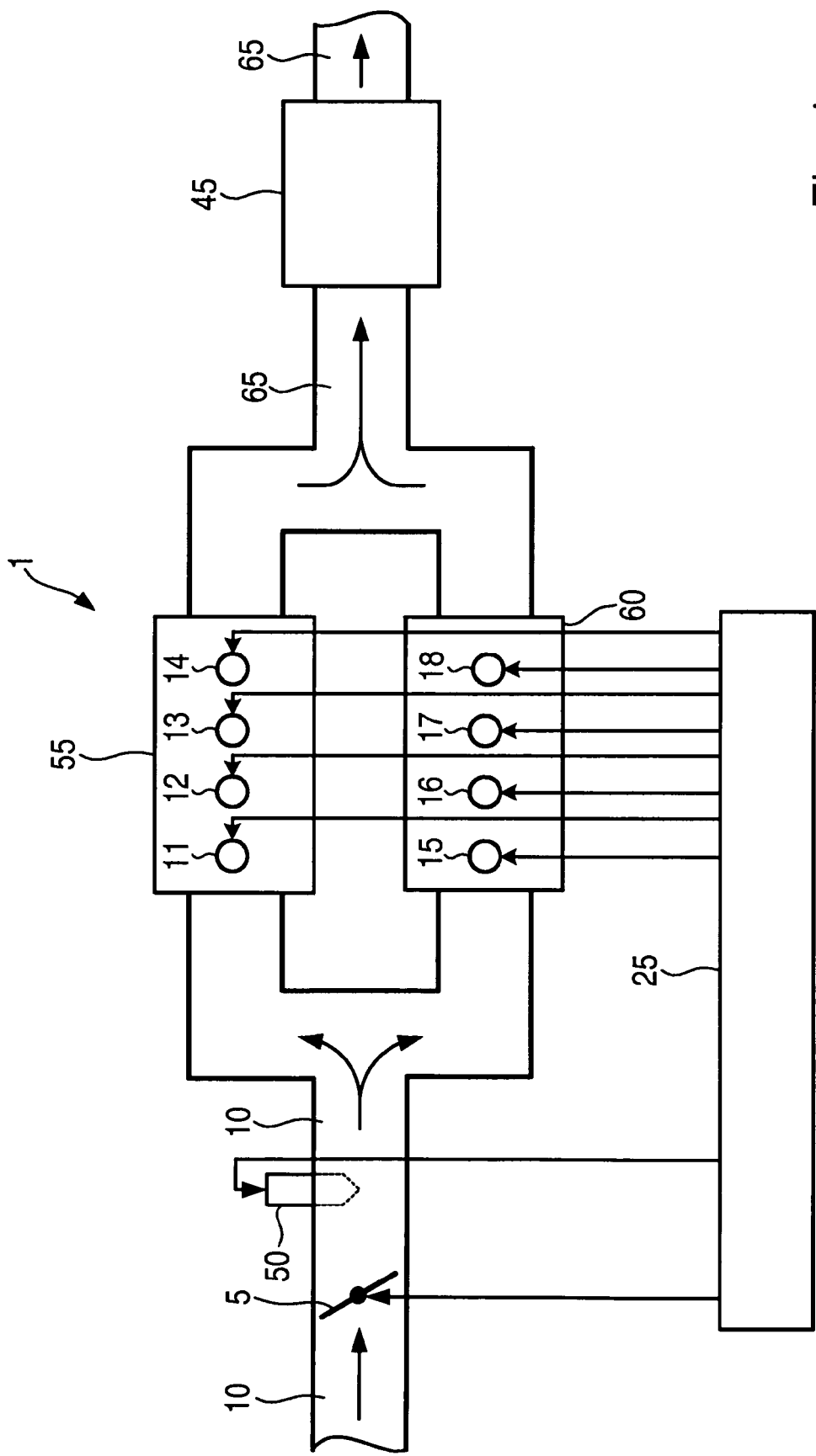
FIG. 1 shows a block diagram of an internal combustion engine having two cylinder banks.

In FIG. 1, 1 designates an internal combustion engine, which drives a vehicle, for example. Internal combustion engine 1 may take the form of an Otto engine or a Diesel engine, for instance. In this example, internal combustion engine 1 includes an even number n of cylinder banks, in the example of FIG. 1, n being equal to 2. Alternatively, the present invention may also be implemented using an odd number of cylinder banks, for instance, even using only a single one. Each cylinder bank in the present example includes the same number of cylinders. Thus, internal combustion engine 1 includes a first cylinder bank 55 having a first cylinder 11, a second cylinder 12, a third cylinder 13 and a fourth cylinder 14, according to the example. Furthermore, internal combustion engine 1 according to FIG. 1 includes a second cylinder bank 60 having a fifth cylinder 15, a sixth cylinder 16, a seventh cylinder 17 and an eighth cylinder 18. Fresh air is supplied to cylinders 11, . . . , 18 of the two cylinder banks 55, 60 via an air supply 10. An actuator 5 for influencing the air quantity supplied to cylinders 11, . . . , 18 is situated in air supply 10. This air quantity varies, in this instance, as a function of the setting or the position or the opening angle or the degree of opening of actuator 5. In the following, it is assumed by way of example that actuator 5 exists in the form of a throttle valve. The flow direction of the air in air supply 10 is indicated in FIG. 1 by arrows. The position of the throttle valve or the opening angle is controlled by a control unit 25 in a manner known to one skilled in the art, for instance, as a function of the operation of an accelerator (not shown in FIG. 1), or as a function of the request by another vehicle system not shown in FIG. 1, such as an antilock system, a wheel slip traction control, a driving-dynamics control, a vehicle speed controller or the like. Downstream of throttle valve 5, fuel is injected into air supply 10 via a fuel injector 50, the control of fuel injector 50, and thus the fuel metering being also set by control unit 25, for instance, for setting a specified air/fuel mixture ratio, in a manner known to one skilled in the art. Alternatively, the fuel injection may also take place upstream from throttle valve 5 into air supply 10, or directly into the combustion chambers of cylinders 11, ..., 18.

Furthermore, it is provided according to FIG. 1 that one may control the valve mechanism of cylinders 11, ..., 18, and with that their intake valves and their exhaust valves, on the part of engine control unit 25, in the manner known to one skilled in the art, using a fully variable valve control. Alternatively, this valve mechanism may also be set by using camshafts in a manner known to one skilled in the art. The exhaust gas formed during the combustion of the air/fuel mixture in the combustion chambers of cylinders 11, ..., 18 is ejected via the exhaust valves of cylinders 11, ... 18 into an exhaust branch 65. In FIG. 1, the flow direction of the exhaust gas in exhaust branch 65 is likewise indicated by arrows. In exhaust branch 65, in this instance, there is an exhaust gas aftertreatment device 45, for example, in the form of a catalytic converter, in order to avoid as best as possible the emission of undesired pollutants by converting them.

Figure 2:
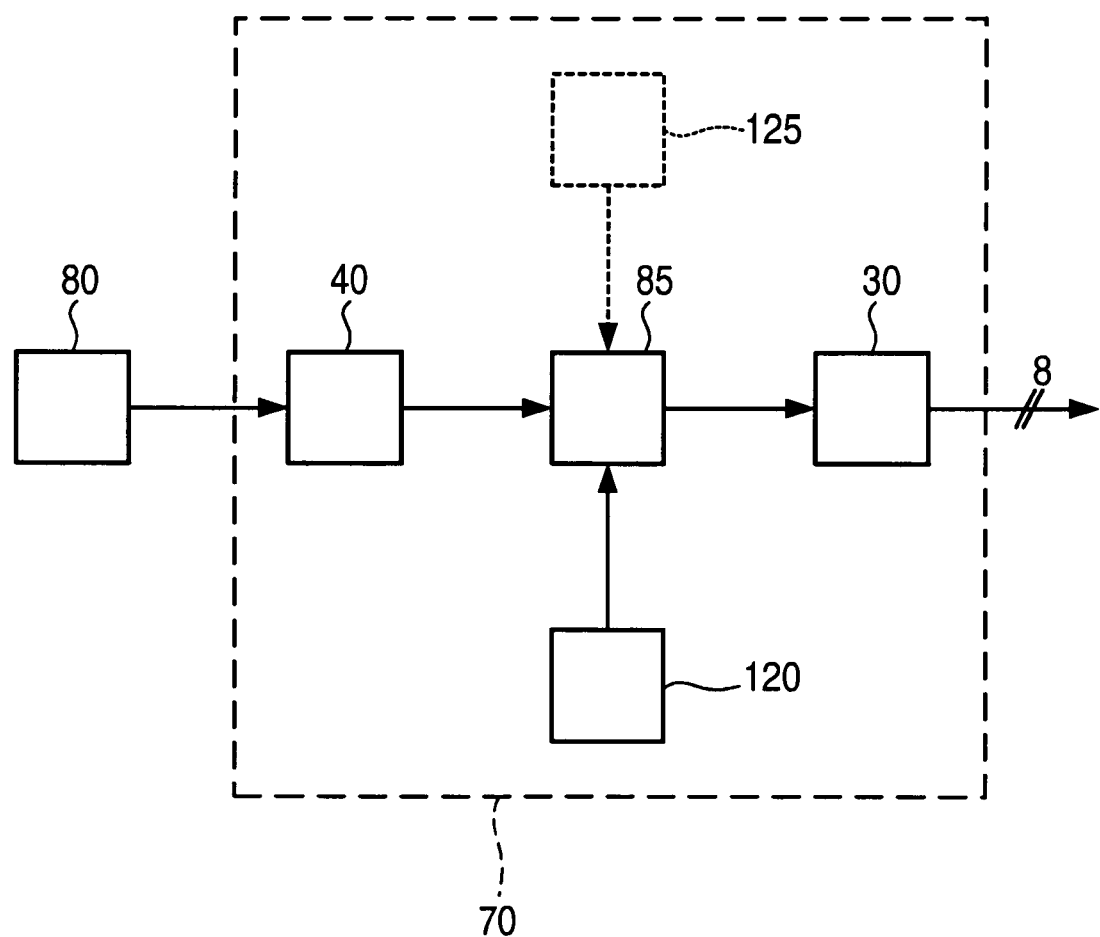
FIG. 2 shows a flow chart for changing the charge changing process state of at least one cylinder of the internal combustion engine as a function of a request.

FIG. 2 shows a flow chart marked with reference numeral 70, with the aid of which the charge changing process state of at least one of cylinders 11, 12, ..., 18 of the internal combustion engine is changed as a function of a received request. Flow chart 70 may be implemented, for example, as software and/or hardware in engine control unit 25, in this instance. Flow chart 70 includes a receiving unit 40 for receiving a request from a request-generating unit 80 that is located outside flow chart 70. Such a request may be, for instance, a request to change the temperature gradient of exhaust gas aftertreatment device 45. In this context, such a request may be generated by engine control unit 25. For this purpose, engine control unit 25 compares, for instance, an actual temperature of catalytic converter 45 to a setpoint temperature of catalytic converter 45, and derives from this deviation a request to change the temperature gradient, with respect to time, of catalytic converter 45. Thus, for example, when the setpoint temperature of the catalytic converter falls below the actual temperature of the catalytic converter by more than a specified value, engine control unit 25 may request an increase in the temperature gradient. When the setpoint temperature of the catalytic converter is exceeded by more than a specified value by the actual temperature of the catalytic converter, engine control unit 25 may conversely request a reduction in the temperature gradient of catalytic converter 45. The request for the change in the temperature gradient is specified, in this instance, by request-generating unit 80, which may also be implemented in engine control unit 25 as hardware and/or software. Another example for a request is a deceleration request, for decelerating the vehicle driven by internal combustion engine 1. Such a deceleration request is received by control unit 25, for instance, based on the operation of a brake pedal by the driver, or as a deceleration request of a vehicle system such as an antilock system, a wheel slip traction control, a driving-dynamics control, etc. In this case, request-generating unit 80 represents the corresponding vehicle system or the brake pedal module.

Receiving unit 40 receives the described request from request-generating unit 80, and passes it on to a conversion unit 85 in the flow chart. Conversion unit 85 converts the received request to a request to the charge changing process of cylinders 11, 12, ..., 18, and passes this request on to means 30 for changing the charge changing process state of cylinders 11, 12, ..., 18. Means 30, in this context, include an actuating system which sets the valve mechanism of the intake valves and/or exhaust valves of each cylinders 11, 12, ..., 18 according to the request supplied by conversion unit 85. The intake valves and/or exhaust valves of each cylinders 11, 12, ..., 18 are able to be set individually by means 30, that is, opened or closed, in this instance. In this context, each cylinders 11, ..., 18 includes one or more intake valves and one or more exhaust valves. All the intake valves and/or all the exhaust valves of each cylinders 11, 12, ..., 18 may be durably closed by means 30, so that the charge changing process over the corresponding cylinder is interrupted or deactivated during this time. Since each of cylinders 11, ..., 18 is able to be controlled individually in the manner described, FIG. 2 shows eight outputs of means 30. A change in the charge changing process state of at least one of cylinders 11, ..., 18 thus comes about because the charge changing process is interrupted over the at least one of cylinders 11, ..., 18, starting from an activated state by the durable closing of all its intake valves and/or all its exhaust valves. Conversely, the charge changing process state of the at least one of cylinders 11, ..., 18 is changed by reactivating the charge changing process over the at least one of cylinders 11, ..., 18, starting from the interrupted state, in that the intake valves and/or exhaust valves of the at least one of cylinders 11, ..., 18 are opened and closed to carry out the charge changing process in the usual way, alternatingly depending on the cylinder timing.

In one advantageous specific embodiment, two operating states of internal combustion engine 1 are distinguished with regard to the charge changing process state of cylinders 11, ..., 18. In a first operating state, the charge changing process is interrupted over half the cylinders 11, ..., 18 by the durable closing of its intake valves and/or exhaust valves. In this context, either the charge changing process may be interrupted over all the cylinders of one of the two cylinder banks 55, 60, whereas the charge changing process is activated over all the cylinders of the other two cylinder banks 55, 60. Alternatively, half the cylinders of first cylinder bank 55 and half the cylinders of second cylinder bank 60, or generally, half the cylinders independently of on which cylinder bank they are located, may be deactivated with respect to the charge changing process, whereas the charge changing process is activated over the remaining cylinders. Generally, and also in the case of an uneven number of cylinder banks, the important thing is only that a part, for instance, one-half, of all cylinders of internal combustion engine 1 is deactivated with respect to the charge changing process, and the other part of all the cylinders of internal combustion engine 1 is activated with respect to the charge changing process. If the firing order of cylinders 11, ..., 18 is as follows, for instance:

First cylinder 11, fifth cylinder 15, second cylinder 12, sixth cylinder 16, third cylinder 13, seventh cylinder 17, fourth cylinder 14, eighth cylinder 18.

It may also be provided to exclude every other cylinder of the firing order from the charge changing process, in this context, independently of on which cylinder bank it is located, and to activate the charge changing process over the remaining cylinders. In the example described, the case, for instance, where all the cylinders 11, 12, 13, 14 of first cylinder bank 55 are excluded from the charge changing process, and the charge changing process is activated over all the cylinders 15, 16, 17, 18 of second cylinder bank 60 would precisely lead to the situation where every other cylinder in the firing order is excluded from the charge changing process, whereas the remaining cylinders in the ignition sequence have a charge changing process. This procedure effects as quiet as possible an engine operation in spite of the charge changing process being interrupted in one-half of the cylinders.

In a second operating state, all cylinders 11, ..., 18 are to be activated with respect to the charge changing process.

The change in the charge changing process state of cylinders 11, ..., 18 now takes place simply by switching over between the first operating state and the second operating state. The first operating state is also denoted as half engine operation and the second operating state is also denoted as full engine operation, in this context. This switchover between the two operating states may take place both in the operating and the nonoperating state of internal combustion engine 1. In the nonoperating engine, the fuel injection is durably blanked out via fuel injector 50, in contrast to operating engine, during which fuel is regularly injected. The operating engine of internal combustion engine 1, for instance, characterizes an acceleration state and the nonoperating engine is present, for instance, in an overrun of internal combustion engine 1. The nonoperating acceleration state of internal combustion engine 1 is also denoted as deceleration fuel cutoff, that is, the affected fuel injectors of all cylinders are closed.

We shall start below in exemplary fashion from the assumption that the switchover between the first operating state and the second operating state takes place in the nonoperating engine of internal combustion engine 1, that is, for example, during deceleration fuel cutoff.

It is assumed below that request generating unit 80 emits a deceleration request that is received by receiving unit 40, and is passed on to conversion unit 85. Conversion unit 85 generates a request for setting the first operating state or the second operating state as a function of the magnitude of the deceleration request received. In principle, it is sufficient in this case if the first operating state and the second operating state differ in the number of cylinders 11, 12, ..., 18 whose charge changing process is interrupted. For the sake of simplicity, it should be assumed, in this context, that the number of cylinders 11, 12, ..., 18, whose charge changing process is interrupted, is selected to be greater in the first operating state than in the second operating state.

According to one simple exemplary embodiment that does not restrict generality, it is to be assumed that, in the first operating state, the charge changing process of half of cylinders 11, 12, ..., 18 is interrupted according to the half engine operation described before, every other cylinder in the firing sequence being supposed to be interrupted advantageously and to ensure as quiet as possible an engine operation. In the second operating state, for the sake of simplicity, in this example the charge changing process is to be activated in all cylinders 11, ..., 18. In flow chart 70, a first read-only memory 120 is provided, and optionally a second read-only memory 125. In first read-only memory 120 a first specified threshold value is stored. In second read-only memory 125 a second specified threshold value is stored.

Conversion unit 85 now checks whether the magnitude of the received deceleration request is greater than the first specified threshold value. If so, conversion unit 85 causes means 30 to switch over from the first operating state to the second operating state. If, on the other hand, the magnitude of the received deceleration request is below the second specified threshold value, conversion unit 85 induces means 30 to switch over from the second operating state to the first operating state.

For the sake of simplicity, the first specified threshold value and the second specified threshold value may be selected to be the same. In this case, second read-only memory 125 is dispensable. However, in order to implement a hysteresis and to prevent too frequent consecutive switchovers between the first operating state and the second operating state, it is meaningful to select the first operating state and the second operating state to be of different magnitudes, so that in this case, both first read-only memory 120 is provided for storing the first specified threshold value and second read-only memory 125 is provided for storing the second specified threshold value in flow chart 70. The two read-only memories 120, 125 may be integrated in a common memory component, in this context. The first specified threshold value should be selected to be greater than the second specified threshold value. The first specified threshold value and the second specified threshold value may, for instance, be suitably applied on a test stand, in order to be able to implement as completely as possible the possible deceleration requests by the two operating states of the internal combustion engine.

In response to switching over from half engine operation to full engine operation, the charge changing process losses of internal combustion engine 1 increase, and the clutch torque is reduced. Because of this, a greater vehicle deceleration is achieved in full engine operation as compared to half engine operation. The charge changing process losses of internal combustion engine 1 decrease and the clutch torque increases because of the switchover from full engine operation to half engine operation. This leads to a lower vehicle deceleration in half engine operation than in full engine operation.

The interruption of the charge changing process over the at least one cylinder 11, 12, ..., 18 takes place by the durable closing of its intake valves and/or exhaust valves, or, in other words, by the deactivation of its valve mechanism on the intake and/or exhaust side. The activation of the charge changing process over the at least one cylinders 11, 12, ..., 18 takes place by the operation of the intake valves and/or exhaust valves of this at least one cylinder 11, 12, ..., 18 in the usual manner which is described above, which, in other words, is also designated as activating the valve mechanism of this at least one cylinder on the intake and/or exhaust side.

The method described is particularly suitable in overrun operation at deceleration fuel cutoff, that is, in engine operating mode of internal combustion engine 1.

What is claimed is:

1. A method for operating an internal combustion engine, comprising:
   receiving a deceleration request; and
      making a switchover between a first operating state and a second operating state of the internal combustion engine as a function of a magnitude of the deceleration request, the first operating state and the second operating state differing in a number of cylinders whose charge changing process is interrupted.

2. The method according to claim 1, wherein the engine is operated in a nonoperating state.

3. The method according to claim 1, wherein the number of cylinders, whose charge changing process is interrupted, is selected to be greater in the first operating state than in the second operating state.

4. The method according to claim 3, wherein the charge changing process of half of the cylinders is interrupted in the first operating state.

5. The method according to claim 4, wherein the charge changing process of every other one of cylinders in the firing order is interrupted in the first operating state.

6. The method according to claim 3, wherein the charge changing process is activated in all the cylinders in the second operating state.

7. The method according to claim 1, wherein a switchover from the first operating state to the second operating state takes place in response to a deceleration request that is above a first specified threshold value.

8. The method according to claim 7, wherein a switchover from the second operating state to the first operating state takes place in response to a deceleration request that is below a second specified threshold value.

9. The method according to claim 8, wherein the first specified threshold value and the second specified threshold value are selected to be of the same magnitude.

10. The method according to claim 8, wherein the first specified threshold value and the second specified threshold value are selected to be of different magnitudes.

11. The method according to claim 1, wherein a hysteresis is set by selecting the first operating state and the second operating state to be of different magnitudes, and wherein the first specified threshold value is selected to be larger than the second specified threshold value.

12. The method according to claim 1, wherein at least one of intake valves and exhaust valves of each of the cylinders are set individually.

13. A device for operating an internal combustion engine in a nonoperating state, comprising:
   means for receiving a deceleration request; and
      means for switching over between a first operating state and a second operating state of the internal combustion engine as a function of a magnitude of the deceleration request, the first operating state and the second operating state differing in a number of cylinders whose charge changing process is interrupted.

14. The device according to claim 13, wherein a switchover from the first operating state to the second operating state takes place in response to a deceleration request that is above a first specified threshold value.

15. The device according to claim 13, wherein a switchover from the second operating state to the first operating state takes place in response to a deceleration request that is below a second specified threshold value.

16. The device according to claim 13, wherein a hysteresis is set by selecting the first operating state and the second operating state to be of different magnitudes, and wherein the first specified threshold value is selected to be larger than the second specified threshold value.

17. The device according to claim 13, wherein at least one of intake valves and exhaust valves of each of the cylinders are set individually.

18. The device according to claim 13, wherein the number of cylinders, whose charge changing process is interrupted, is selected to be greater in the first operating state than in the second operating state.

19. The device according to claim 13, wherein a switchover from the first operating state to the second operating state takes place in response to a deceleration request that is above a first specified threshold value, and wherein a switchover from the second operating state to the first operating state takes place in response to a deceleration request that is below a second specified threshold value.

* * * * *